United States Patent
Remy et al.

(10) Patent No.: US 12,234,370 B2
(45) Date of Patent: Feb. 25, 2025

(54) EPOXY COMPOSITIONS

(71) Applicant: CARBOLINE INTERNATIONAL CORPORATION, St. Louis, MO (US)

(72) Inventors: Nicolas C. Remy, De Soto, MO (US); John O. Kloepper, St. Charles, MO (US); Tom A. Calzone, Chesterfield, MO (US)

(73) Assignee: Carboline International Corporation, St. Louis, MO (US)

( * ) Notice: Subject to any disclaimer, the term of this patent is extended or adjusted under 35 U.S.C. 154(b) by 243 days.

(21) Appl. No.: 17/175,946

(22) Filed: Feb. 15, 2021

(65) Prior Publication Data

US 2022/0002578 A1 Jan. 6, 2022

Related U.S. Application Data

(60) Provisional application No. 63/047,325, filed on Jul. 2, 2020.

(51) Int. Cl.
*C09D 163/04* (2006.01)
*C08L 63/04* (2006.01)

(52) U.S. Cl.
CPC ............ *C09D 163/04* (2013.01); *C08L 63/04* (2013.01)

(58) Field of Classification Search
None
See application file for complete search history.

(56) References Cited

U.S. PATENT DOCUMENTS

| | | |
|---|---|---|
| 2012/0251729 A1* | 10/2012 | Horstman ............ C09D 163/00 427/386 |
| 2013/0115442 A1 | 5/2013 | Sang et al. |
| 2015/0240112 A1 | 8/2015 | Hulteen et al. |
| 2020/0010608 A1 | 1/2020 | Peters et al. |

OTHER PUBLICATIONS

F Nihal Tuzun, The Effect of Filler Size, Rheology Control Agent Content and Temperature Variation on Viscosity of Epoxy Resin System, https://www.inase.org/library/2015/zakynthos/bypaper/CIMC/CIMC-07.pdf (Year: 2015).*
Lee, Jong-Hyuk et al., Rheological Properties of Resin Composites According to Variations in Monomer and Filler Composition, Dental Materials 22(6):515-26 (2006) (Year: 2006).*
Jianhui Tang et al., An Investigation of Inorganic Fillers on Rheological Properties and Tensile Strength of Epoxy Repair Coating Using Mixture Design Method, Construction and Building Materials, vol. 307, 124866 (2021) (Year: 2021).*
European Search Report from European Application No. 2115779.4 dated Jun. 22, 2021 (6 pages).

* cited by examiner

*Primary Examiner* — Megan McCulley
(74) *Attorney, Agent, or Firm* — Calfee, Halter & Griswold LLP

(57) ABSTRACT

An epoxy composition is provided that includes a polyepoxy aniline, a rheology modifier, a filler, and a polyamine hardener comprising a cyclic hydrocarbon-containing polyamine. When cured, the epoxy composition provides an advantageous chemical resistance at high temperatures and pressures. Additionally, the cured epoxy compositions have good adhesion to substrates and resist blistering.

25 Claims, No Drawings

EPOXY COMPOSITIONS

CROSS-REFERENCE TO RELATED APPLICATION

This application is based on, and claims the benefit of, U.S. Provisional Application Ser. No. 63/047,325, filed Jul. 2, 2020, the entire disclosure of which is incorporated herein by reference.

FIELD

The present disclosure relates to epoxy compositions that include a polyepoxy aniline compound and a polyamine hardener and the use of the epoxy compositions as coatings.

BACKGROUND

Various coatings have been employed as linings to protect equipment for the containment, transportation, and use of corrosive or caustic chemicals. For example, baked phenolic linings are often employed for use as linings for sulfuric acid. However, the baking step required to cure phenolic coatings is difficult, costly, and is not feasible with certain tank configurations. Further, vinyl esters are often employed due to their resistance to oxidizing and acidic environments. However, vinyl esters may have limited high temperature resistance, and generally are required to be applied as thick films, that may need to be reinforced. Moreover, vinyl esters, in general, are difficult to apply and may expose workers to styrene during application. Additionally, epoxy novolac resins, in general, provide good chemical resistance. However, epoxy novolac resins have limited resistance to many acids, strong oxidizers, and are not resistant to extreme heat.

Presently there is a market need for linings that can be easily applied that have good stability to high temperatures and are resistant to aggressive chemicals that substantially degrade and destroy current technologies without the need for a force cure.

SUMMARY

Disclosed herein are epoxy compositions that include a polyepoxy aniline compound and a polyamine hardener. To illustrate various aspects of the present disclosure, several exemplary embodiments of the epoxy compositions are provided.

In accordance with the present disclosure an epoxy composition is provided comprising a polyepoxy aniline, a rheology modifier, a filler, and a polyamine hardener comprising a cyclic hydrocarbon-containing polyamine.

In accordance with the present disclosure the epoxy composition further includes a compound selected from the group consisting of novolac epoxy resins, epoxy functional silanes, solvents, molecular sieves, pigments, and combinations thereof.

In accordance with the present disclosure the epoxy composition further includes a novolac epoxy.

In accordance with the present disclosure the epoxy composition further includes an epoxy functional silane.

In accordance with the present disclosure the epoxy composition further includes a solvent.

In accordance with the present disclosure the epoxy composition further includes a molecular sieve.

In accordance with the present disclosure the epoxy composition further includes a pigment.

In accordance with the present disclosure the epoxy composition further includes additives selected from the group consisting of dispersants, flow and leveling controllers, defoamers, and combinations thereof.

In accordance with the present disclosure the polyepoxy aniline is 4-glycidyloxy-N,N-diglycidylaniline.

In accordance with the present disclosure the rheology modifier is a compound selected from the group consisting of waxes, fumed silica, clays, liquid rheology modifiers, and combinations thereof.

In accordance with the present disclosure the filler is a material selected from the group consisting of powdered minerals, ground silica, powdered silicon carbide, ceramic microspheres, mica, and combinations thereof.

In accordance with the present disclosure the polyamine hardener is a compound selected from the group consisting of benzene-1,3-dimethaneamine, 4,4'-methylenebis(cyclohexylamine), and combinations thereof.

In accordance with the present disclosure the pigment is a compound selected from the group consisting of titanium dioxide, iron oxides, carbon black, phthalocyanine blue, and combinations thereof.

In accordance with the present disclosure the composition has a viscosity measured at 25° C. and 10 or 100 rpm in the range of 1,000 cps to 50,000 cps.

In accordance with the present disclosure a coated article is provided comprising a surface; and a coating on the surface, the coating formed from the epoxy composition according to any of claims 1-14.

In accordance with the present disclosure the surface defines an interior surface of a vessel, pipe, or tank requiring protection from corrosion due to its service environment.

In accordance with the present disclosure the coated article is selected from the group consisting of slug catchers, knock out drums, reflex drums, amine absorbers, amine regenerators, flare stacks, scrubbers, down hole pumps, down hole pipes, fire tubes, heat exchangers, storage tanks, tank cars, treaters, separators, reactors, neutralizers, pumps, and combinations thereof.

In accordance with the present disclosure the coating has a thickness in the range of 100 microns to 3000 microns.

In accordance with the present disclosure the coating is a single layer.

In accordance with the present disclosure the coating withstands a pressure of in the range of 14.7 psi to 4,000 psi.

In accordance with the present disclosure the coating withstands a temperature of at least 260° C. for 30 days.

In accordance with the present disclosure the coating has a glass transition temperature in the range of 60° C. to 220° C.

In accordance with the present disclosure a coating system is provided comprising: (i) a first composition comprising: a polyepoxy aniline, a rheology modifier, and a filler; and (ii) a second composition comprising a polyamine hardener comprising a cyclic hydrocarbon-containing polyamine.

In accordance with the present disclosure method of preparing a coated article is provided, the method comprising applying a coating composition to a surface of an article, wherein the coating composition is prepared by combining (i) a first composition comprising: a polyepoxy aniline, a rheology modifier, and a filler; and (ii) a second composition comprising: a polyamine hardener comprising a cyclic hydrocarbon-containing polyamine.

In accordance with the present disclosure the step of applying a coating composition to a surface of an article is performed using an airless sprayer, brush, roller, squeegee, trowel, or a combination thereof.

Numerous other aspects, advantages, and/or features of the general inventive concepts will become more readily apparent from the following detailed description of exemplary embodiments and from the claims.

DETAILED DESCRIPTION

The present disclosure is directed, at least in part, to compositions that include a polyepoxy aniline compound and a polyamine hardener, which for the purpose of this disclosure may simply be referred to herein as the "epoxy composition." In accordance with the present disclosure, the epoxy compositions may include a polyepoxy aniline, a rheology modifier, a filler, and a polyamine hardener. It has been found that when the polyepoxy aniline compound is cured after mixing with a polyamine hardener, such as a polyamine hardener comprising a cyclic hydrocarbon-containing polyamine, a coating may be formed from the epoxy composition that has an advantageous chemical resistance at high temperatures and pressures. While not wishing to be bound by any particular method of operation or theory, it is believed that the reaction between the polyepoxy aniline and the cyclic hydrocarbon-containing polyamine results in a dense polymer matrix an provides beneficial properties for use as a coating or a lining. For example, a cured coating of the epoxy composition prevents, at least partially, the penetration of hot gasses under high pressure. Additionally, the cured coatings resulting from the epoxy compositions have good adhesion to substrates and resist blistering. Advantageously, the cured coatings resulting from the epoxy compositions can provide good adhesion to substrates and resist blistering with requiring a forced cure (e.g., heat curing). The coatings formed from the epoxy compositions may be used as linings in the preparation and transportation of oil and gas. Additionally, the coatings formed from the epoxy compositions may be used as linings for the containment and transfer of hazardous and corrosive chemicals such as molten sulfur, sulfuric acid, methanol, and methylene chloride. In accordance the present disclosure, the cured epoxy composition may coat or line an interior surface of a vessel, tank, or pipe (internal or external) that requires protection from corrosion due to its service environment.

Suitable polyepoxy aniline compounds include an aniline group and two or more epoxide groups, where each epoxide group is either attached directly through a covalent bond or indirectly tethered through a divalent group to the aniline group. In accordance with the present disclosure, the polyepoxy aniline may include one or two epoxide groups attached directly or indirectly to the nitrogen atom of the aniline group. Additional epoxide groups may be attached directly or indirectly through a heteroatom bonded to the benzene ring of the aniline group. Suitable heteroatoms that may be used to attach an epoxide group to the benzene ring include oxygen atoms and nitrogen atoms. In accordance with the present disclosure, the polyepoxy aniline may include 2, 3, or 4 epoxide groups. Exemplary polyepoxy aniline compounds include, but are not limited to, 4-glycidyloxy-N,N-diglycidylaniline and N,N-diglycidylaniline.

In accordance with the present disclosure, the epoxy composition may include greater than 16 wt %, 17 wt %, or 17.5 wt % of the polyepoxy aniline based upon the total weight of the epoxy composition. In accordance with the present disclosure, the epoxy composition may include less than 26 wt %, 22 wt %, or 20 wt % of the polyepoxy aniline based upon the total weight of the epoxy composition. In accordance with the present disclosure, the epoxy composition may include the polyepoxy aniline in the range of 16 wt % to 26 wt %, 17 wt % to 22 wt %, or 17.5 wt % to 20 wt % based upon the total weight of the epoxy composition.

Suitable polyamine hardeners include one or more polyamine compounds that are capable of reacting with the polyepoxy aniline during a curing process. In accordance with the present disclosure, the polyamine compounds include two or more primary amine groups. The polyamine hardener may include 2, 3, 4, or 5 amine groups. In accordance with the present disclosure, the epoxy composition may be free or substantially free of hardeners that include polyamides and/or amidoamines.

Polyamine compounds for use in the polyamine hardener include cyclic hydrocarbon-containing polyamines. Suitable cyclic hydrocarbon-containing polyamines include at least one cyclic hydrocarbon group and two or more primary amine groups each individually attached directly through a covalent bond or indirectly tethered through a divalent group to a cyclic hydrocarbon group of the cyclic hydrocarbon-containing polyamine. In accordance with the present disclosure, when the cyclic hydrocarbon-containing polyamine includes more than one cyclic hydrocarbon group, the cyclic hydrocarbons may be polycyclic and have atoms that are included in two or rings. Alternatively, the cyclic hydrocarbon-containing polyamine may include two or more cyclic hydrocarbon groups connected via a divalent organic group. In accordance with the present disclosure, the cyclic hydrocarbon-containing polyamine may include 1, 2, 3, 4, or 5 cyclic hydrocarbon groups. Suitable cyclic hydrocarbon groups that may be employed in the cyclic hydrocarbon-containing polyamine include, but are not limited to benzene groups, cyclohexene groups, and combinations thereof.

In accordance with the present disclosure, the cyclic hydrocarbon-containing polyamine may be characterized by the molecular weight of the cyclic hydrocarbon-containing polyamine. In accordance with the present disclosure, the cyclic hydrocarbon-containing polyamine may have a molecular weight greater than 100 g/mol, 110 g/mol, 130 g/mol, 150 g/mol, or 170 g/mol. In accordance with the present disclosure, the cyclic hydrocarbon-containing polyamine may have a molecular weight less than 800 g/mol, 700 g/mol, 550 g/mol, 300 g/mol, or 250 g/mol. In accordance with the present disclosure, the cyclic hydrocarbon-containing polyamine may have a molecular weight in the range of 100 g/mol to 800 g/mol, 110 g/mol to 700 g/mol, 130 g/mol to 550 g/mol, 150 g/mol to 300 g/mol, or 170 g/mol to 250 g/mol.

Exemplary cyclic hydrocarbon-containing polyamines include but are not limited to benzene-1,3-dimethaneamine ("MXDA"), 4,4'-methylenebis(cyclohexylamine) ("PACM"), and combinations thereof.

In accordance with the present disclosure, the epoxy composition may include greater than 12 wt % or 12.5 wt % of the polyamine compound based upon the total weight of the epoxy composition. In accordance with the present disclosure, the epoxy composition may include less than 14 wt % or 13.5 wt % of the polyamine compound based upon the total weight of the epoxy composition. In accordance with the present disclosure, the epoxy composition may include the polyamine compound in the range of 12 wt % to 14 wt % or 12.5 wt % to 13.5 wt % based upon the total weight of the epoxy composition.

In accordance with the present disclosure, the polyamine hardener may include two or more polyamine compounds. For example, the polyamine hardener may include benzene-1,3-dimethaneamine and 4,4'-methylenebis(cyclohexylamine). In certain embodiments, the polyamine hardener may be characterized by the molar ratio of benzene-1,3-dimethaneamine to 4,4'-methylenebis(cyclohexylamine). In accordance with the present disclosure, the molar ratio of benzene-1,3-dimethaneamine to 4,4'-methylenebis(cyclohexylamine) in the polyamine hardener may be in the range of 0.01:1 to 1:0.01, 0.1:1 to 1:0.1, 0.2:1 to 1:0.2, 0.5:1 to 1:0.5, 0.8:1 to 1:0.8, or 0.9:1 to 1:0.9.

In accordance with the present disclosure, the amount of polyepoxy aniline and polyamine hardener in the epoxy composition may be characterized by the molar ratio of the epoxide groups in the polyepoxy aniline to the primary amine groups in the polyamine hardener. In accordance with the present disclosure, the molar ratio of the epoxide groups in the polyepoxy aniline to the primary amine groups in the polyamine hardener in the epoxy composition may be greater than 1:1.3, 1:1.2, or 1:1.1. In accordance with the present disclosure, the molar ratio of the epoxide groups in the polyepoxy aniline to the primary amine groups in the polyamine hardener in the epoxy composition may be less than 1.8:1, 1.5:1, or 1.3:1. In accordance with the present disclosure, the molar ratio of the epoxide groups in the polyepoxy aniline to the primary amine groups in the polyamine hardener in the epoxy composition may be in the range of about 1:1.3 to 1.8:1, 1:1.2 to 1.5:1, and 1:1.1 to 1.3:1.

As indicated above, the epoxy composition includes a rheology modifier. Suitable rheology modifiers include compounds that adjust the rheological (flow) properties of the epoxy composition. In certain embodiments, the rheology modifier may be a thixotropic additive. Exemplary rheology modifier include, but are not limited to waxes, fumed silica, clays, liquid rheology modifiers, and combinations thereof. Specific examples of waxes include heat activated polyamides, preactived polyamides, and combinations thereof. Specific examples of clays include organoclays, preactivated and polar activated, and combinations thereof. Specific examples of liquid rheology modifiers include solutions of a modified urea and 1-methyl-2-pyrrolidone and combinations thereof.

In accordance with the present disclosure, the epoxy composition may include greater than 0.5 wt %, 0.7 wt %, or 0.8 wt % of the rheology modifier based upon the total weight of the epoxy composition. In accordance with the present disclosure, the epoxy composition may include less than 2.4 wt %, 2 wt %, or 1.2 wt % of the rheology modifier based upon the total weight of the epoxy composition. In accordance with the present disclosure, the epoxy composition may include the rheology modifier in the range of 0.5 wt % to 2.4 wt %, 0.7 wt % to 2 wt %, or 0.8 wt % to 1.2 wt % based upon the total weight of the epoxy composition.

As indicated above, the epoxy composition includes a filler. Suitable fillers in include, but are not limited to, powdered minerals, ground silica, powdered silicon carbide, ceramic microspheres, mica, fused mullite, and combinations thereof. When used as a filler, fused mullite may impart properties similar to a molecular sieve.

In accordance with the present disclosure, the epoxy composition may include greater than 45 wt %, 47 wt %, or 48.5 wt % of the filler based upon the total weight of the epoxy composition. In accordance with the present disclosure, the epoxy composition may include less than 60 wt %, 55 wt %, or 52.5 wt % of the filler additive based upon the total weight of the epoxy composition. In accordance with the present disclosure, the epoxy composition may include the filler in the range of 45 wt % to 60 wt %, 47 wt % to 55 wt %, or 48.5 wt % to 52.5 wt % based upon the total weight of the epoxy composition.

In accordance with the present disclosure, the epoxy composition may include a phenol-formaldehyde resin. Suitable phenol-formaldehyde resins include, but are not limited to, novolac phenol resins, resole phenol resins. The phenol-formaldehyde resin may be a modified phenol-formaldehyde resin. Modified phenol-formaldehyde resin include, for example, epoxy novalac resins and amine-phenol-formaldehyde resins. The amine-phenol-formaldehyde resin may be prepared, for example, by reacting an amine with phenol and formaldehyde in a Mannich or modified Mannich reaction. In certain embodiments, the amine used to prepare the amine-phenol-formaldehyde may include the polyamine hardener. Accordingly, when the polyamine hardener is used to prepare the amine-phenol-formaldehyde resin, the portion of the amine-phenol-formaldehyde resin in the epoxy composition may overlap with the polyamine hardener. The epoxy novalac resin may be prepared, for example, by reacting a phenol-formaldehyde novolac with epichlorohydrin.

In accordance with the present disclosure, the epoxy composition may include greater than 0 wt %, 3 wt %, 5 wt %, or 7 wt % of the epoxy novalac resin based upon the total weight of the epoxy composition. In accordance with the present disclosure, the epoxy composition may include less than 10 wt %, 9.8 wt %, 9.5 wt %, or 9 wt % of the epoxy novalac resin based upon the total weight of the epoxy composition. In accordance with the present disclosure, the epoxy composition may include the epoxy novalac resin in the range of 0 wt % to 10 wt %, 3 wt % to 9.8 wt %, 5 wt % to 9.5 wt %, or 7 wt % to 9 wt % based upon the total weight of the epoxy composition.

In accordance with the present disclosure, the epoxy composition may include one or more silane compounds. Suitable silane compounds that may be included in the epoxy composition include amino functional silanes, alkoxy functional silanes and epoxy functional silanes.

In accordance with the present disclosure, the epoxy composition may include amino functional silanes. Amino functional silanes include monomeric or polymeric silane compounds that include one or more amino functional groups. Monomeric silanes may function as reactive diluents in the epoxy composition. In addition to the amino functional group, the amino functional silane may include one or more additional functional groups, such as for example, alkoxy groups. Specific examples of amino functional silanes include, but are not limited to, gamma-aminopropyltriethoxysilane.

In accordance with the present disclosure, the epoxy composition may include greater than 0 wt %, 0.5 wt %, or 1 wt % of the amino functional silane based upon the total weight of the epoxy composition. In accordance with the present disclosure, the epoxy composition may include less than 2 wt %, 3 wt %, or 5 wt % of the amino functional silane based upon the total weight of the epoxy composition. In accordance with the present disclosure, the epoxy composition may include the amino functional silane in the range of 0 wt % to 5 wt %, 0.5 wt % to 3 wt %, or 1 wt % to 2 wt % based upon the total weight of the epoxy composition.

In accordance with the present disclosure, the epoxy composition may include an alkoxy functional silane. Alkoxy functional silanes include monomeric or polymeric silane compounds that include one or more alkoxy functional groups. Specific examples of alkoxy functional groups include, but are not limited to methoxy, ethoxy, and benzyloxy groups. Monomeric silanes may function as reactive diluents in the epoxy composition. In addition to the alkoxy functional group, the alkoxy functional silane may include one or more additional functional groups, such as for example, amino groups.

In accordance with the present disclosure, the epoxy composition may include greater than 0 wt %, 0.5 wt %, or 1 wt % of the alkoxy functional silane based upon the total weight of the epoxy composition. In accordance with the present disclosure, the alkoxy composition may include less than 2 wt %, 3 wt %, or 5 wt % of the epoxy functional silane based upon the total weight of the epoxy composition. In accordance with the present disclosure, the alkoxy composition may include the epoxy functional silane in the range of 0 wt % to 5 wt %, 0.5 wt % to 3 wt %, or 1 wt % to 2 wt % based upon the total weight of the epoxy composition.

In accordance with the present disclosure, the epoxy composition may include an epoxy functional silane. Epoxy functional silanes include monomeric or polymeric silane compounds that include one or more epoxide functional groups. Monomeric silanes may function as reactive diluents in the epoxy composition. In addition to the epoxide functional group, the epoxy functional silane may include one or more additional functional groups, such as for example, alkoxy groups. Specific examples of epoxy functional silanes include, but are not limited to, gamma-glycidoxy-propyl trimethoxysilane.

In accordance with the present disclosure, the epoxy composition may include greater than 0 wt %, 0.5 wt %, or 1 wt % of the epoxy functional silane based upon the total weight of the epoxy composition. In accordance with the present disclosure, the epoxy composition may include less than 2 wt %, 3 wt %, or 5 wt % of the epoxy functional silane based upon the total weight of the epoxy composition. In accordance with the present disclosure, the epoxy composition may include the epoxy functional silane in the range of 0 wt % to 5 wt %, 0.5 wt % to 3 wt %, or 1 wt % to 2 wt % based upon the total weight of the epoxy composition.

In accordance with the present disclosure, the epoxy composition may include a solvent. In accordance with the present disclosure, the epoxy composition may also be free of solvents. Suitable solvents include, but are not limited to, methyl ethyl ketone (MEK), xylene, toluene, acetone, and combinations thereof.

In accordance with the present disclosure, the epoxy composition may include greater than 0 wt %, 0.5 wt %, 1 wt %, 1.5 wt %, 2 wt %, 2.5 wt %, or 3.5 wt % of the solvent based upon the total weight of the epoxy composition. In accordance with the present disclosure, the epoxy composition may include less than 50 wt %, 35 wt %, 55 wt %, 15 wt %, 6.5 wt %, 5.5 wt %, or 4.5 wt % of the solvent based upon the total weight of the epoxy composition. In accordance with the present disclosure, the epoxy composition may include the solvent in the range of 0 wt % to 50 wt %, 0.5 wt % to 35 wt %, 1 wt % to 25 wt %, 1.5 wt % to 15 wt %, 2 wt % to 6.5 wt %, 2.5 wt % to 5.5 wt %, or 3.5 wt % to 4.5 wt % based upon the total weight of the epoxy composition.

In accordance with the present disclosure, the epoxy composition may include a molecular sieve. Molecular sieves may be used to allow the cured coating composition to absorb gasses such as hydrogen sulfide or carbon dioxide. Those skilled in the art will appreciate that molecular sieves may be characterized by the diameter of the molecules that they are capable of absorbing in angstroms. Suitable molecular sieves for use in the epoxy composition include molecular sieves rated at 3 Å or larger. Suitable molecular sieves include, but are not limited to, zeolites.

In accordance with the present disclosure, the epoxy composition may include greater than 0 wt %, 0.5 wt %, or 1 wt % of the molecular sieve based upon the total weight of the epoxy composition. In accordance with the present disclosure, the epoxy composition may include less than 2 wt %, 3 wt %, or 5 wt % of the molecular sieve based upon the total weight of the epoxy composition. In accordance with the present disclosure, the epoxy composition may include the molecular sieve in the range of 0 wt % to 5 wt %, 0.5 wt % to 3 wt %, or 1 wt % to 2 wt % based upon the total weight of the epoxy composition.

In accordance with the present disclosure, the epoxy composition may include a pigment. Suitable pigments include, but are not limited to, titanium dioxide, iron oxides, carbon black, phthalocyanine blue, and combinations thereof. In accordance with the present disclosure, the epoxy composition may include greater than 0 wt %, 1 wt %, or 2 wt % of the pigment based upon the total weight of the epoxy composition. In accordance with the present disclosure, the epoxy composition may include less than 15 wt %, 10 wt %, or 5 wt % of the pigment based upon the total weight of the epoxy composition. In accordance with the present disclosure, the epoxy composition may include the pigment in the range of 0 wt % to 15 wt %, 1 wt % to 10 wt %, or 2 wt % to 5 wt % based upon the total weight of the epoxy composition.

The epoxide composition may include one or more additional additives. Suitable additives for use in the include, but are not limited to, dispersants, flow and/or leveling controllers, defoamers, and combinations thereof.

In accordance with the present disclosure, the epoxy composition may be prepared from a coating system. The coating system may include two or more compositions that, when combined, form the epoxy composition. In accordance with the present disclosure, the coating system may include a first composition, which may also be referred to as part A, and a second composition, which may also be referred to as part B.

In accordance with the present disclosure, the first composition may include the polyepoxy aniline, the rheology modifier, and the filler. The first composition may optionally include one or more of epoxy novolac resins, epoxy functional silanes, solvents, molecular sieves, dispersants, flow and/or leveling controllers, defoamers, and pigments.

In accordance with the present disclosure, the first composition may include the polyepoxy aniline in the range of 19 wt % to 30 wt %, 20 wt % to 28 wt %, or 22 wt % to 26 wt % based upon the total weight of the first composition. In accordance with the present disclosure, the first composition may include the rheology modifier in the range of 0.4 wt % to 1.6 wt %, 0.5 wt % to 1.4 wt %, or 0.6 wt % to 1.2 wt % based upon the total weight of the first composition. In accordance with the present disclosure, the first composition may include the filler in the range of 51 wt % to 68 wt %, 53 wt % to 65 wt %, or 55 wt % to 63 wt % based upon the total weight of the first composition. In accordance with the present disclosure, the first composition may include the epoxy novolac resins in the range of 0 wt % to 11 wt %, 0.5 wt % to 10 wt %, or 1 wt % to 8 wt % based upon the total weight of the first composition. In accordance with the present disclosure, the first composition may include the epoxy functional silanes in the range of 0 wt % to 6 wt %, 0.1 wt % to 5 wt %, or 0.5 wt % to 4 wt % based upon the total weight of the first composition. In accordance with the present disclosure, the first composition may include the solvent in the range of 0 wt % to 8 wt %, 0.1 wt % to 7 wt %, or 0.5 wt % to 6 wt % based upon the total weight of the first composition. In accordance with the present disclosure, the first composition may include the pigment in the range of 0 wt % to 6 wt %, 0.1 wt % to 5 wt %, or 1 wt % to 4 wt % based upon the total weight of the first composition. In accordance with the present disclosure, the first composition may include the molecular sieve in the range of 0 wt % to 5 wt %, 0.5 wt % to 4.5 wt %, or 1 wt % to 4 wt % based upon the total weight of the first composition.

In accordance with the present disclosure, the second composition may include the polyamine hardener. The second composition may option include one or more of fillers, rheology modifiers, dispersants, flow and/or leveling controllers, phenol-formaldehyde resins, and defoamers.

In accordance with the present disclosure, the second composition may include the polyamine hardener in the range of 75 wt % to 100 wt %, 80 wt % to 95 wt %, or 85 wt % to 90 wt % based upon the total weight of the second composition. In accordance with the present disclosure, the second composition may include the rheology modifier in the range of 0 wt % to 2 wt %, 0.1 wt % to 1.8 wt %, or 0.3 wt % to 1.5 wt % based upon the total weight of the second composition. In accordance with the present disclosure, the second composition may include the filler in the range of 0 wt % to 23 wt %, 1 wt % to 20 wt %, or 2 wt % to 18 wt % based upon the total weight of the second composition.

The components of the epoxy composition may be mixed or combined by any conventional method. The epoxy composition has a long working time (e.g., 1 hour) after the epoxy composition is mixed. Accordingly, the epoxy composition may be prepared by batch mixing. The use of batch mixing is advantageous, because the epoxy compositions can be applied by a single operator using a single component sprayer, and thus a plural component sprayer with more than one operator can be avoided.

In accordance with the present disclosure, the epoxy composition may be characterized by the viscosity of the epoxy composition, which may be determined at 25° C. on a viscometer, such as a Brookfield Viscometer. The epoxy composition should have a viscosity that is low enough for the epoxy composition to be sprayed, for example using an airless sprayer. It should be appreciated that once the polyepoxy amine and the polyamine hardener are combined, the epoxy composition will begin to cure. Accordingly, any coating of the epoxy composition should be performed within 60 minutes of combining the polyepoxy amine and the polyamine hardener. In accordance with the present disclosure, the epoxy composition may have a viscosity measured at 25° C. and 10 or 100 rpm that is greater than 1,000 cps, 2,000 cps, or 3,000 cps. In accordance with the present disclosure, the epoxy composition may have a viscosity that is less than 50,000 cps, 30,000 cps, or 20,000 cps. In accordance with the present disclosure, the epoxy composition may have a viscosity that is in the range of 1,000 cps to 50,000 cps, 2,000 cps to 30,000 cps, or 3,000 cps to 20,000 cps. In accordance with the present disclosure, the epoxy composition may also have a viscosity that is greater than 50,000 cps when measured at 25° C. and 10 or 100 rpm. For example, the epoxy composition may be prepared as a putty or hand applied material. A putty may be prepared by including fumed silica in the epoxy composition. Further, when the epoxy composition is prepared as a putty, the epoxy composition may be sandwiched with fiberglass for a reinforcement on a tank bottom.

In accordance with the present disclosure, the first composition (i.e., part A) may have a viscosity measured at 25° C. and 10 rpm that is greater than 8,000 cps, 9,000 cps, or 10,000 cps. In accordance with the present disclosure, the first composition may have a viscosity measured at 25° C. and 10 rpm that is less than 50,000 cps, 30,000, or 20,000 cps. In accordance with the present disclosure, the first composition may have a viscosity measured at 25° C. and 10 rpm that is in the range of 8,000 cps to 50,000 cps, 9,000 cps to 30,000 cps, or 10,000 to 20,000 cps.

In accordance with the present disclosure, the first composition may have a viscosity measured at 25° C. and 100 rpm that is greater than 1,700 cps, 2,000 cps, or 2,500 cps In accordance with the present disclosure, the first composition may have a viscosity measured at 25° C. and 100 rpm that is less than 15,000 cps, 13,000, or 12,000 cps. In accordance with the present disclosure, the first composition may have a viscosity measured at 25° C. and 100 rpm that is in the range of 1,700 cps to 15,000 cps, 2,000 cps to 13,000 cps, or 2,500 to 12,000 cps.

In accordance with the present disclosure, the second composition (i.e., part B) may have a viscosity measured at 25° C. and 10 rpm that is greater than 2,000 cps, 2,500 cps, or 3,000 cps. In accordance with the present disclosure, the second composition may have a viscosity measured at 25° C. and 10 rpm that is less than 10,000 cps, 9,000, or 8,000 cps. In accordance with the present disclosure, the second composition may have a viscosity measured at 25° C. and 10 rpm that is in the range of 2,000 cps to 10,000 cps, 2,500 cps to 9,000 cps, or 3,000 to 8,000 cps. In accordance with the present disclosure, the second composition may have a viscosity measured at 25° C. and 100 rpm that is greater than 2,000 cps, 2,200 cps, or 2,400 cps. In accordance with the present disclosure, the second composition may have a viscosity measured at 25° C. and 100 rpm that is less than 4,000 cps, 3,800, or 3,600 cps. In accordance with the present disclosure, the second composition may have a viscosity measured at 25° C. and 100 rpm that is in the range of 2,000 cps to 4,000 cps, 2,200 cps to 3,800 cps, or 2,400 to 3,600 cps.

The epoxy composition may begin to cure upon the combination of the polyepoxy aniline and the polyamine harder. In accordance with the present disclosure, the epoxy composition may be free of catalysts and or polymerization initiators. The epoxy composition may be cured over a wide range of temperatures. In accordance with the present disclosure, the epoxy composition may be cured at a temperature in the range of 2° C. to 260° C. Suitable temperatures for curing the epoxy composition under ambient conditions may be in the range of 2° C. to 45° C., 15° C. to 40° C., or 20° C. to 30° C. While those skilled in the art will appreciate that curing is generally faster at higher temperatures, under ambient conditions the epoxy composition may be dry to the touch in 2.5 hrs to 15 hrs, 3 hrs to 9 hrs, of 3.5 hrs to 6 hrs. While curing may be performed under ambient temperatures, in some embodiments the epoxy compositions may be baked. Baking may be performed by curing the epoxy composition at elevated temperatures. For example, the epoxy composition may be baked at 65° C. to 260° C., 95° C. to 230° C., or 150° C. to 205° C. Further, the epoxy composition may be baked for 2 hrs to 6 hrs, or 2.5 hrs to 5 hrs, or 3 hrs to 4 hrs.

After the epoxy composition is prepared and prior to curing, the epoxy composition may be applied to a substrate as a coating. The epoxy composition may be applied to substrates by conventional means, e.g., brush, roller, squeegee, trowel, a sprayer (e.g., airless sprayer) or a combination thereof. The epoxy composition may be applied in a single or multilayer coating. Single layer coatings may be advantageous because they may provide less downtime due to curing, lower labor costs, and require less material. Multilayer coatings may include 2, 3, 4, 5, or more layers. Typically, when multiple coatings of the epoxy composition are applied to a substrate, the coatings should be water washed or abraded between coatings to increase adhesion between successive coatings. Suitable substrates include metals, fiberglass, concrete, and possibly other coatings, and combinations thereof.

The coatings formed from the cured epoxy composition may be characterized by the coating thickness. In accordance with the present disclosure, the coating may have a thickness greater than 100 microns, 150 microns, 200 microns, 250 microns, or 275 microns, 300 microns. In accordance with the present disclosure, the coating may have a thickness less than 3000 microns, 2500 microns, 2000 microns, 1500 microns, 1000 microns, or 800 microns. In accordance with the present disclosure, the coating may have a thickness in the range of 100 microns to 3000 microns, 150 microns to 2500 microns, 200 microns to 2000 microns, 250 microns to 1500 microns, 275 microns to 1000 microns, or 300 microns to 800 microns.

The cured epoxy compositions may be characterized by a dry glass transition temperature ("dry Tg"). The dry glass transition temperature may also be referred to as an initial glass transition temperature and is the glass transition temperate obtained of the cured epoxy composition prior to any exposure to a corrosive chemical environment. In accordance with the present disclosure, the cured epoxy composition may have a dry Tg greater than 60° C., 75° C., 90° C., or 100° C. In accordance with the present disclosure, the cured epoxy composition may have a dry Tg less than 250° C., 220° C., 180° C., or 130° C. In accordance with the present disclosure, the cured epoxy composition may have a dry Tg in the range of 60° C. to 250° C., 75° C. to 220° C., 90° C. to 180° C., or 100° C. to 130° C.

In accordance with the present disclosure, the cured epoxy composition, when cured under ambient conditions, may have a dry Tg greater than 60° C., 75° C., or 80° C. In accordance with the present disclosure, the cured epoxy composition, when cured under ambient conditions, the cured epoxy composition may have a dry Tg less than 210° C., 190° C., or 130° C. In accordance with the present disclosure, the cured epoxy composition, when cured under ambient conditions, the cured epoxy composition may have a dry Tg in the range of 60° C. to 210° C., 75° C. to 190° C., or 80° C. to 130° C.

In accordance with the present disclosure, the cured epoxy composition, when baked the cured epoxy composition may have a dry Tg greater than 90° C., 100° C., or 110° C. In accordance with the present disclosure, the cured epoxy composition, when baked the cured epoxy composition may have a dry Tg less than 250° C., 220° C., or 190° C. In accordance with the present disclosure, the cured epoxy composition, when baked the cured epoxy composition may have a dry Tg in the range of 90° C. to 250° C., 100° C. to 220° C., or 110° C. to 190° C.

The coatings of the cured epoxy composition may be used under a wide range of pressures. In accordance with the present disclosure, the cured epoxy composition may be used at a wide range of pressure in combination with the temperatures or chemicals disclosed herein. In accordance with the present disclosure, the cured epoxy composition may be stable at pressures of at least 14.7 psi, 200 psi, or 400 psi. In accordance with the present disclosure, the cured epoxy composition may be stable at pressures of at most 4,000 psi, 2,000 psi, or 1,000 psi. In accordance with the present disclosure, the cured epoxy composition may be stable at pressures in the range of 14.7 psi to 4,000 psi, 200 psi to 2,000 psi, or 400 psi to 1,000 psi.

The coatings of the cured epoxy composition may be used under a wide range of temperatures. In accordance with the present disclosure, the cured epoxy composition may withstand a temperature of at least 180° C., 220° C., 240° C., or 260° C. for 30 days.

Coatings of the cured epoxy composition may exhibit an advantageous adhesion to substrates when exposed to boiling water. In accordance with the present disclosure, the boiling water adhesion may be determined according to NACE TM 0174-2002 Procedure A using a steel panel coated on a single side and exposing it to boiling water for a period of 6 months. After exposure to boiling water the adhesion to the steel panel may be visually inspected for signs of retained adhesion or degradation of the coating.

Coatings of the cured epoxy composition may exhibit an advantageous chemical resistance when exposed to hot solvents (e.g., temperatures up to 120° F.) and/or acids. Exemplary solvents that the cured epoxy shows resistance to include a 50/50 mix of kerosene and toluene, methanol, and methylene chloride. An exemplary acid that the cured epoxy shows resistance to includes concentrated sulfuric acid (e.g., 95-96% sulfuric acid). In accordance with the present disclosure, the chemical resistance to solvents and/or acids may be determined according to NACE TM 0174-2002, Procedure B using a coated substrate. After exposure to the solvents and/or acid, the coating may be visually inspected for signs of retained adhesion or degradation of the coating.

In accordance with the present disclosure, the cured epoxy coating exhibits no visual destruction of the coating after exposure to a 50/50 mix of kerosene and toluene at 163° C. for 6 months, 9 months, 12 months, or 24 months. In accordance with the present disclosure, the cured epoxy coating exhibits no visual destruction of the coating after exposure to methanol at 49° C. for 6 months, 9 months, 12 months, or 24 months. In accordance with the present disclosure, the cured epoxy coating exhibits no visual destruction of the coating after exposure to methylene chloride at 49° C. for 6 months, 9 months, 12 months, or 24 months. In accordance with the present disclosure, the cured epoxy coating exhibits no visual destruction of the coating after exposure to concentrated sulfuric acid and 49° C. for 6 months, 9 months, 12 months, or 24 months.

In accordance with the present disclosure, the cured epoxy coating exhibits no blistering of the coating after exposure to a 50/50 mix of kerosene and toluene at 163° C. for 6 months, 9 months, 12 months, or 24 months. In accordance with the present disclosure, the cured epoxy coating exhibits no blistering of the coating after exposure to methanol at 49° C. for 6 months, 9 months, 12 months, or 24 months. In accordance with the present disclosure, the cured epoxy coating exhibits no blistering of the coating after exposure to methylene chloride at 49° C. for 6 months, 9 months, 12 months, or 24 months. In accordance with the present disclosure, the cured epoxy coating exhibits no blistering of the coating after exposure to concentrated sulfuric acid at 49° C. for 6 months, 9 months, 12 months, or 24 months.

In accordance with the present disclosure, the coating stability may be determined according to NACE TM 0185 2000, using a carbon steel substrate coated with a single coating of the epoxy composition. Testing may be performed at in an autoclave 248° F. at a pressure of 1200 PSI using three phases. The three phases include a gas phases of 90% nitrogen and 10% carbon dioxide, a hydrocarbon phase of a 50/50 mix of kerosene and toluene, and a water phase of 1% sodium chloride in deionized water. Samples may be decompressed and brought to ambient temperatures and tested for visual signs of failure (e.g., disbondment or blistering) after 1000 hours, 1500 hours, 2000 hours, 2500, and 3000 hours. In accordance with the present disclosure, the cured epoxy coating exhibits no visual signs of blistering and/or disbondment after 1000 hours, 1500 hours, 2000 hours, 2500, and 3000 hours in the autoclave according to the NACE TM 0185 2000 standard.

The epoxy compositions may be used as substitutes for coatings or linings made from vinyl esters, novolacs, and baked phenols in environments that need high-end coatings or linings. For example, the epoxy compositions of the present disclosure can be used as coatings or linings in the preparation and transportation of oil and gas. Additionally, the epoxy compositions may be used as coatings or linings for the containment and transfer of hazardous and/or corrosive chemicals including, but not limited to, molten sulfur, sulfuric acid, hot water, steam, and solvents. Specific uses for the cured epoxy compositions include coatings or linings for slug catchers, knock out drums, reflex drums, amine absorbers, amine regenerators, flare stacks, scrubbers, down hole pumps, down hole pipes, fire tubes, heat exchangers, storage tanks, tank cars, treaters, separators, reactors, neutralizers, and pumps.

EXAMPLES

In order to more thoroughly describe the subject matter Applicant regards as its invention, the following working examples are provided:

Samples were prepared by applying a single coating to an ASTM A36 carbon steel substrate that has been prepared by sandblasting to a standard of SSPC-SP10 or better. The coated substrates were allowed to cure for at least 7 days at ambient conditions. The coatings were evaluated for performance in an autoclave using a modified NACE TM 0185 2000 Autoclave test. Testing was performed at 248° F. at a pressure of 1200 PSI using three phases. The three phases are a gas phases of 90% nitrogen and 10% carbon dioxide, a hydrocarbon phase of a 50/50 mix of kerosene and toluene, and a water phase of 1% sodium chloride in deionized water. Samples were decompressed and brought to ambient temperatures and tested for visual signs of failure (e.g., disbondment or blistering) after 1000 hours, 1500 hours, 2000 hours, 2500, and 3000 hours.

The coating compositions of the examples were prepared from two-part coatings. The two-part coatings included a part A and a part B as outlined in Tables 1-6. The coatings were compared to Phenoline 1205, a novolac lining, available from Carboline; Plasite 4550 HT a novolac lining, available from Carboline; and Belzona 1593, a novolac epoxy, available from Belzona.

TABLE 1

| Part A-1 Part A-1 | |
| --- | --- |
| Description | Weight % |
| 4-glycidyloxy-N,N-diglycidylaniline | 20.08% |
| Epoxy functional silane | 4.93% |
| Dispersant | 0.37% |
| Acrylic flow modifier (flow leveling agent) | 0.29% |
| Silicone foam control agent (defoamer) | 0.12% |
| Polysiloxane polymer defoamer | 0.12% |
| Titanium dioxide | 5.51% |

TABLE 1-continued

| Part A-1 Part A-1 | |
| --- | --- |
| Description | Weight % |
| Silicon carbide | 40.60% |
| Powdered mineral (aluminosilicate solid ceramic spheres) | 25.95% |
| 160 Mesh Mica White Waterground | 1.45% |
| Organoclay (thixotrope) | 0.23% |
| Modified urea (liquid rheology modifier) | 0.35% |

TABLE 2

| Part A-2 Part A-2 | |
| --- | --- |
| Description | Weight % |
| 4-glycidyloxy-N,N-diglycidylaniline | 20.58% |
| Epoxy novolac resin | 13.55% |
| Epoxy functional silane | 5.68% |
| Dispersant | 0.44% |
| Acrylic flow modifier (flow leveling agent) | 0.34% |
| Silicone foam control agent (defoamer) | 0.15% |
| Polysiloxane polymer defoamer | 0.15% |
| Methyl ethyl ketone | 4.77% |
| Bentone clay | 2.15% |
| Crystalline silica | 24.38% |
| Silicon carbide | 27.24% |
| Modified urea (liquid rheology modifier) | 0.57% |

TABLE 3

| Part A-3 Part A-3 | |
| --- | --- |
| Description | Weight % |
| 4-glycidyloxy-N,N-diglycidylaniline | 30.45% |
| Dispersant | 0.45% |
| Silicone foam control agent (defoamer) | 0.15% |
| Polysiloxane polymer defoamer | 0.15% |
| Titanium dioxide | 4.15% |
| Crystalline silica | 40.15% |
| 160 Mesh Mica White Waterground | 9.43% |
| Organoclay (thixotrope) | 0.39% |

TABLE 4

| Part A-4 Part A-4 | |
| --- | --- |
| Description | Weight % |
| 4-glycidyloxy-N,N-diglycidylaniline | 30.45% |
| Epoxy functional silane | 6.06% |
| Dispersant | 0.39% |
| Acrylic flow modifier (flow leveling agent) | 0.30% |
| Silicone foam control agent (defoamer) | 0.13% |
| Polysiloxane polymer defoamer | 0.13% |

TABLE 4-continued

Part A-4

| Part A-4 | |
| --- | --- |
| Description | Weight % |
| Methyl ethyl ketone | 3.94% |
| Silicon carbide | 47.22% |
| 160 Mesh Mica White Waterground | 9.70% |
| Bentone clay | 1.34% |

TABLE 5

Part B-1

| Part B-1 | |
| --- | --- |
| Description | Weight % |
| Benzene-1,3-dimethaneamine-based high functionality aliphatic amine [40% benzene-1,3-dimethaneamine] | 75.30% |
| 160 Mesh Mica White Waterground | 13.00% |
| Powdered mineral (aluminosilicate solid ceramic spheres) | 10.02% |
| Defoamer | 0.37% |
| Organoclay (thixotrope) | 0.84% |
| Modified urea (liquid rheology modifier) | 0.28% |

TABLE 6

Part B-2

| Part B-2 | |
| --- | --- |
| Description | Weight % |
| Benzene-1,3-dimethaneamine-based high functionality aliphatic amine [40% benzene-1,3-dimethaneamine] | 100.00% |

Results are summarized in Table 7. Passing samples indicated no visual disbondment or blistering after 3000 hours.

Sample 1 is indicated to pass at 300 hours in the autoclave testing, the coating also provides a high solvent resistance (e.g., methylene chloride @ 100 F/120 F) and a long pot life of approximately 90 min. Additionally, the formulation is near 100% solids. while the formulation may be sprayed a batch mix pump and special tips may be required.

Sample 2 is indicated to fail at 1000 hrs in the autoclave testing, the coating provides a cost-effective formulation that performs well in boiling water, dry heat up to 500° F., impact resistance, steam out performance. The coating has a good pot life of approximately 60 minutes and can be used to form coatings with a cup gun at low mils (about 2-5 wet).

Was not tested under the autoclave conditions disclosed herein. However, this coating has good sulfuric acid resistance and produces a coating with no color change.

Sample 4 is indicated to have failed at the 2,500 hr timepoint. Additionally, this coating has an excellent sprayability and a good pot life of approximately 90 minutes. The coating performs well at low mils (e.g., 4-8 dry), provides a high solvent resistance (e.g., methylene chloride @ 100 F/120 F), and is appropriate for use with hydrogen sulfide/$CO_2$).

TABLE 7

| | | | Autoclave Coating Performance | | | | | |
| --- | --- | --- | --- | --- | --- | --- | --- | --- |
| Sample No. | Form. | Wt Ratio A:B | Molar Ratio epoxide: primary amine | Coating Thickness (mils) | Application Method | Tg ° C. Ambient cure | Tg ° C. Baked | Results |
| S-1 | PtA-1 / PtB-1 | 4.26:1 | 0.6:1 | 25-35 | Spray | 80-130 | 180-200 (2 hrs @ 500° F. | Passed at 3000 hrs. |
| S-2 | PtA-2/ PtB-2 | 7.33:1 | 1.03:1 | 27-44 | Spray | 120 | 160 (4 hrs @ 400° F.) | Failed at 1000 hrs. |
| S-3 | PtA-3/ PtB-1 | 7:1 | 1.55 | 34-38 | Spray | ~190 C. | ~190 C. | Not tested |
| S-4 | PtA-4/ PtB-1 | 6.4:1 | 1.03:1 | 6-15 | Spray | 120 | 160-180 (2 hrs @ 500° F.) | Failed at 2500 hrs. |
| C-1 | Phenoline 1205 (novolac lining) | n/a | n/a | 15-20 | Spray | n/a | n/a | Passed |
| C-2 | Plasite 4550 HT (novolac lining) | n/a | n/a | 42-56 | Spray | n/a | n/a | Failed at 1000 hrs. |
| C-3 | Belzona 1593 (novolac epoxy) | n/a | n/a | 40-50 | Hand coated | n/a | n/a | Failed at 1000 hrs. |

What is claimed is:

1. An epoxy composition comprising:
a polyepoxy aniline in an amount of 16 wt % to 26 wt % based upon the total weight of the epoxy composition,
a rheology modifier,
a filler in an amount of 45 wt % to 60 wt % based upon the total weight of the epoxy composition, and
a polyamine hardener comprising a cyclic hydrocarbon-containing polyamine,
wherein the epoxy composition, when cured under ambient conditions, has a dry glass transition temperature of 80° C. or more.

2. The epoxy composition of claim 1, wherein the epoxy composition further includes a compound selected from the group consisting of novolac epoxy resins, epoxy functional silanes, solvents, molecular sieves, pigments, and combinations thereof.

3. The epoxy composition of claim 1, wherein the epoxy composition further includes a novolac epoxy.

4. The epoxy composition of claim 1, wherein the epoxy composition further includes an epoxy functional silane.

5. The epoxy composition of claim 1, wherein the epoxy composition further includes a solvent.

6. The epoxy composition of claim 1, wherein the epoxy composition further includes a molecular sieve.

7. The epoxy composition of claim 1, wherein the epoxy composition further includes a pigment.

8. The epoxy composition of claim 7, wherein the pigment is a compound selected from the group consisting of titanium dioxide, iron oxides, carbon black, phthalocyanine blue, and combinations thereof.

9. The epoxy composition of claim 1, wherein the epoxy composition further includes additives selected from the group consisting of dispersants, flow and leveling controllers, defoamers, and combinations thereof.

10. The epoxy composition of claim 1, wherein the polyepoxy aniline is 4-glycidyloxy-N,N-diglycidylaniline.

11. The epoxy composition of claim 1, wherein the rheology modifier is a compound selected from the group consisting of waxes, fumed silica, clays, liquid rheology modifiers, and combinations thereof.

12. The epoxy composition of claim 1, wherein the filler is a material selected from the group consisting of powdered minerals, ground silica, powdered silicon carbide, ceramic microspheres, mica, and combinations thereof.

13. The epoxy composition of claim 1, wherein the polyamine hardener is a compound selected from the group consisting of benzene-1,3-dimethaneamine, 4,4'-methylenebis(cyclohexylamine), and combinations thereof.

14. The epoxy composition of claim 1, wherein the composition has a viscosity measured at 25° C. and 10 or 100 rpm in the range of 1,000 cps to 50,000 cps.

15. A coated article comprising:
a surface; and
a coating on the surface, the coating formed from the epoxy composition according to claim 1.

16. The coated article of claim 15, wherein the surface defines an interior surface of a vessel, pipe, or tank requiring protection from corrosion due to its service environment.

17. The coated article of claim 15, wherein the coated article is selected from the group consisting of slug catchers, knock out drums, reflex drums, amine absorbers, amine regenerators, flare stacks, scrubbers, down hole pumps, down hole pipes, fire tubes, heat exchangers, storage tanks, tank cars, treaters, separators, reactors, neutralizers, pumps, and combinations thereof.

18. The coated article of claim 15, wherein the coating has a thickness in the range of 100 microns to 3000 microns.

19. The coated article of claim 15, wherein the coating is a single layer.

20. The coated article of claim 15, wherein the coating withstands a pressure of in the range of 14.7 psi to 4,000 psi.

21. The coated article of claim 15, wherein the coating withstands a temperature of at least 260° C. for 30 days.

22. The coated article of claim 15, wherein the coating has a glass transition temperature in the range of 80° C. to 220° C.

23. A coating system comprising:
(i) a first composition comprising:
a polyepoxy aniline in an amount of 19 wt % to 30 wt % based upon the total weight of the first composition,
a rheology modifier, and
a filler in an amount of 51 wt % to 68 wt % based upon the total weight of the first composition; and
(ii) a second composition comprising:
a polyamine hardener comprising a cyclic hydrocarbon-containing polyamine,
wherein the coating system, when combined and cured under ambient conditions, has a dry glass transition temperature of 80° C. or more.

24. A method of preparing a coated article, the method comprising applying a coating composition to a surface of an article, wherein the coating composition is prepared by combining
(i) a first composition comprising:
a polyepoxy aniline in an amount of 19 wt % to 30 wt % based upon the total weight of the first composition,
a rheology modifier, and
a filler in an amount of 51 wt % to 68 wt % based upon the total weight of the first composition; and
(ii) a second composition comprising:
a polyamine hardener comprising a cyclic hydrocarbon-containing polyamine,
wherein the coating composition, when cured under ambient conditions, has a dry glass transition temperature of 80° C. or more.

25. The method of claim 24, wherein the step of applying a coating composition to a surface of an article is performed using an airless sprayer, brush, roller, squeegee, trowel, or a combination thereof.

* * * * *